United States Patent
Truong

(10) Patent No.: US 11,745,855 B2
(45) Date of Patent: Sep. 5, 2023

(54) AIRCRAFT WITH ASYMMETRIC ROTORS

(71) Applicant: Bell Textron Inc., Fort Worth, TX (US)

(72) Inventor: Alexander Dang Quang Truong, Dallas, TX (US)

(73) Assignee: Textron Innovations Inc., Providence, RI (US)

(*) Notice: Subject to any disclaimer, the term of this patent is extended or adjusted under 35 U.S.C. 154(b) by 301 days.

(21) Appl. No.: 17/106,580

(22) Filed: Nov. 30, 2020

(65) Prior Publication Data
US 2022/0169366 A1    Jun. 2, 2022

(51) Int. Cl.
- *B64C 11/46* (2006.01)
- *B64C 39/02* (2023.01)
- *B64C 29/00* (2006.01)
- *B64U 50/13* (2023.01)
- *B64U 70/80* (2023.01)

(52) U.S. Cl.
CPC .......... *B64C 11/46* (2013.01); *B64C 29/0025* (2013.01); *B64C 39/024* (2013.01); *B64U 50/13* (2023.01); *B64U 70/80* (2023.01)

(58) Field of Classification Search
CPC ................ B64C 11/18; B64C 11/16
See application file for complete search history.

(56) References Cited

U.S. PATENT DOCUMENTS

| | | | | |
|---|---|---|---|---|
| 1,775,568 | A * | 9/1930 | Piesik | B64C 11/16 416/228 |
| 1,888,056 | A * | 11/1932 | Verzillo | B64C 11/16 416/231 R |
| 2,222,444 | A * | 11/1940 | Schmidt | B64C 11/16 416/203 |
| 2,687,182 | A * | 8/1954 | Hogan | F04D 29/327 416/21 OR |
| 5,681,145 | A | 10/1997 | Neely et al. | |
| 10,011,351 | B2 * | 7/2018 | McCullough | B64C 25/04 |
| 10,017,249 | B1 | 7/2018 | Tseng et al. | |
| 10,843,807 | B2 * | 11/2020 | Bevirt | B64D 31/12 |
| 2012/0025016 | A1 * | 2/2012 | Methven | B64C 11/00 244/65 |
| 2012/0061526 | A1 * | 3/2012 | Brunken, Jr. | B64C 27/10 244/17.11 |
| 2020/0223538 | A1 * | 7/2020 | Easley | B64C 27/10 |

OTHER PUBLICATIONS

Kim, Tae Young; "Reduction of Tonal Propeller Noise by Means of Uneven Blade Spacing"; University of California Irvine, thesis submitted in partial satisfaction of the requirements for the degree of Masters of Science in Mechanical and Aerospace Engineering; Jan. 2016; 80 pages.

* cited by examiner

*Primary Examiner* — Justin M Benedik
(74) *Attorney, Agent, or Firm* — Bradley Arant Boult Cummings LLP

(57) ABSTRACT

In an embodiment, an aircraft includes an airframe and a first propulsion assembly coupled to the airframe. The first propulsion assembly includes a first rotor hub and a first plurality of rotor blades non-uniformly spaced about the first rotor hub and operable to rotate in a rotor plane with the first rotor hub. The aircraft also includes a second propulsion assembly coupled to the airframe. The second propulsion assembly includes a second rotor hub and a second plurality of rotor blades non-uniformly spaced about the second rotor hub and operable to rotate in a rotor plane with the second rotor hub.

10 Claims, 4 Drawing Sheets

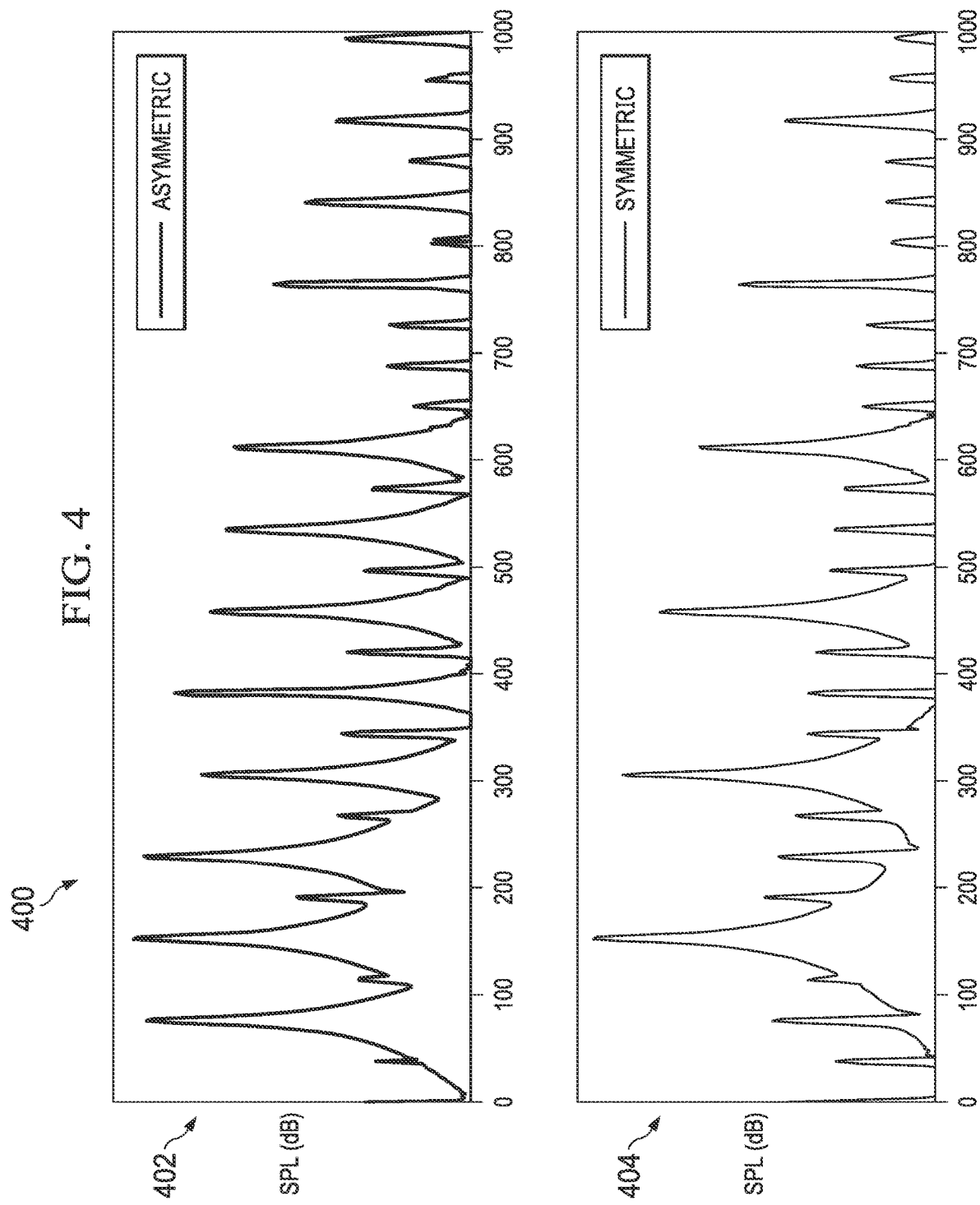

AIRCRAFT WITH ASYMMETRIC ROTORS

BACKGROUND

Technical Field

The present disclosure relates generally to aircraft and more particularly, but not by way of limitation, to aircraft with asymmetric rotors.

History of Related Art

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on it's tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

SUMMARY

In an embodiment, an aircraft includes an airframe and a first propulsion assembly coupled to the airframe. The first propulsion assembly includes a first rotor hub and a first plurality of rotor blades non-uniformly spaced about the first rotor hub and operable to rotate in a rotor plane with the first rotor hub. The aircraft also includes a second propulsion assembly coupled to the airframe. The second propulsion assembly includes a second rotor hub and a second plurality of rotor blades non-uniformly spaced about the second rotor hub and operable to rotate in a rotor plane with the second rotor hub.

In an embodiment, a propulsion assembly includes a rotor hub. The propulsion assembly also includes rotor blades non-uniformly spaced about the rotor hub. The rotor blades are operable to rotate with the rotor hub to provide thrust.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 4 illustrates an example comparison of an asymmetric rotor configuration to a symmetric rotor configuration.

DETAILED DESCRIPTION

Figure 1:
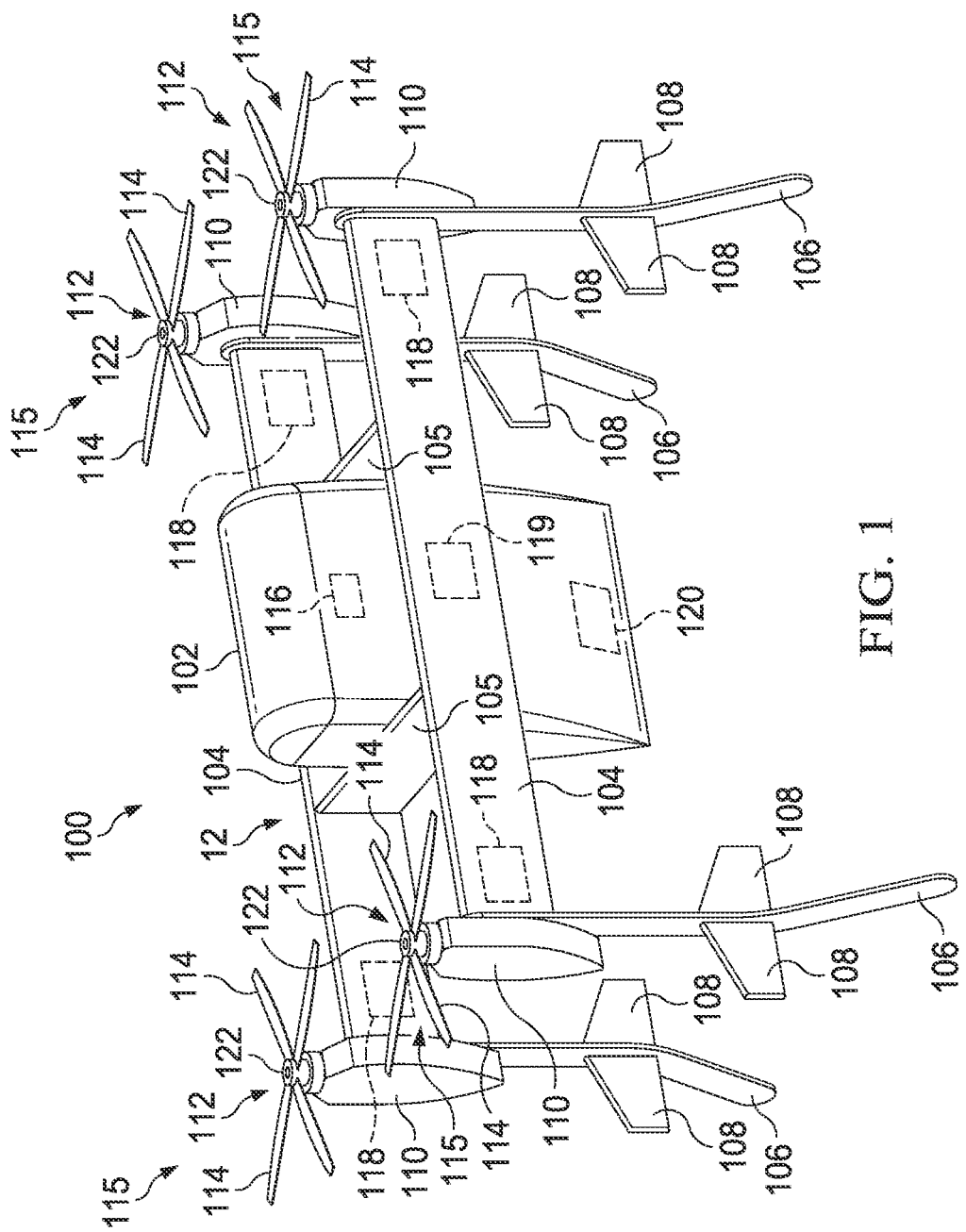
FIG. 1 illustrates an aircraft configured for operation in a helicopter flight mode in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspects) of a component or components. The term "forward" may refer to a special direction that is closer to a front of an aircraft relative to another component or component aspect(s). The term "aft" may refer to a special direction that is closer to a rear of-an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage- of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 2:
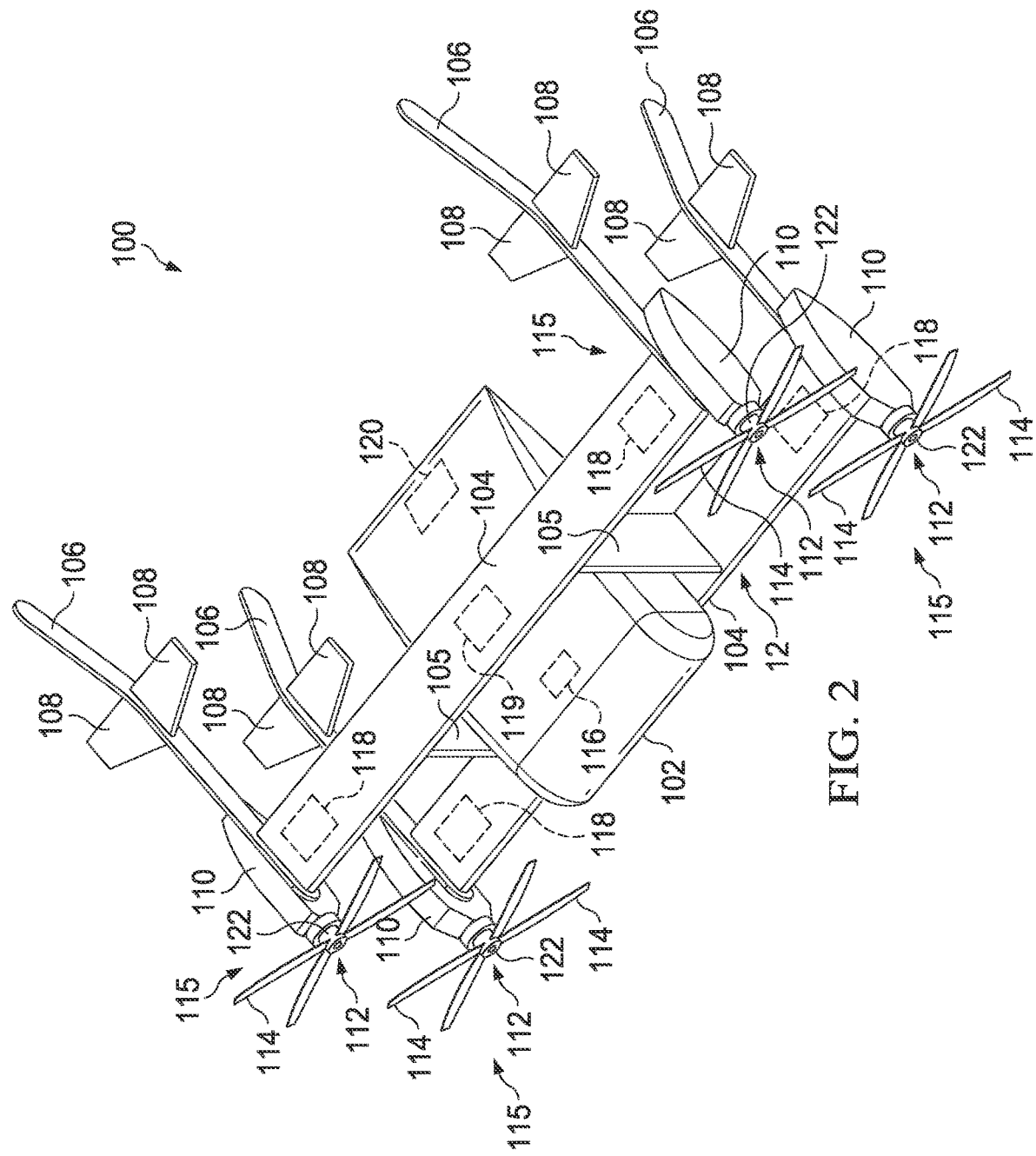
FIG. 2 illustrates an aircraft configured for operation in an airplane flight mode in accordance with embodiments described herein.

Referring now to FIGS. 1 and 2, oblique views of an aircraft 100 are shown according to this disclosure. Aircraft 100 is generally configured as a vertical takeoff and landing ("VTOL") aircraft, more specifically an autonomous pod transport ("APT") convertible drone aircraft, that is operable in a helicopter mode (shown in FIG. 1) associated with vertical takeoff from and landing to a landing zone, hover, and sideward and rearward mobility or flight, and an airplane mode (shown in FIG. 2) associated with forward flight. Additionally, since aircraft 100 is a convertible aircraft, it is also operable in a conversion mode when transitioning between the helicopter and airplane modes. Further, being a drone-type aircraft, aircraft 100 is configured for remote control and operation. Additionally, at least in some embodiments, aircraft 100 may be fully made autonomous and self-directed via a predetermined or preprogrammed location-based guidance system (e.g., global positioning system ("UPS"), coordinate-based location, street address, etc.).

Aircraft 100 includes an airframe 12 having biplane wings 104 and vertical supports 105 disposed between wings 104. Aircraft 100 further includes a removable pod 102 that may function as the aircraft fuselage, tail booms 106, horizontal stabilizers 108 extending from each tail boom 106, and a plurality of pylons 110 each comprising a rotor system 112 having a rotor hub 122 and a plurality of rotor blades 114. Each combination of a pylon 110 and its associated rotor system 112 comprising rotor hub 122 and rotor blades 114 may be referred to herein as a propulsion assembly 115, where each propulsion assembly 115 is coupled to airframe 12. For each propulsion assembly 115, rotor blades 114 are operable to rotate in a. rotor plane with rotor hub 122.

Aircraft 100 also comprises a payload sensor 116, a plurality of aircraft sensors 118, an orientation sensor 119, and a control system 120. Wings 104 comprise a substantially parallel, double-wing configuration that provides lift to the aircraft 100 during forward flight while also maintaining a smaller footprint of the aircraft 100 when the aircraft 100 is on the ground. Vertical supports 105 are disposed on each side of the removable pod 102 and affixed between the wings 104 to provide structure and support to the wings 104. The removable pod 102 is generally positioned between the wings 104 and the vertical supports 105. In the embodiment shown, the removable pod 102 is affixed to the vertical supports 105. However, in other embodiments, the removable pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 provide a wider base for the landing gear. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor in rotor hub 122. However, in other embodiments, the rotor systems 112 may be driven by a combustion engine or auxiliary power unit through a plurality of interconnect driveshafts and/or auxiliary gearboxes, which components may likewise reside in rotor hub 122. Furthermore, since aircraft 100 functions as a convertible aircraft, the rotational speeds of each rotor system 112 may be selectively controlled to orient aircraft 100 in the various flight modes. In an example embodiment, the removable pod 102 of aircraft 100 may enclose various computers or equipment, including the control system 120 and communications equipment. The removable pod 102 may also include space for receiving cargo such as payloads of varying shapes, sizes, and weights.

Figure 3:
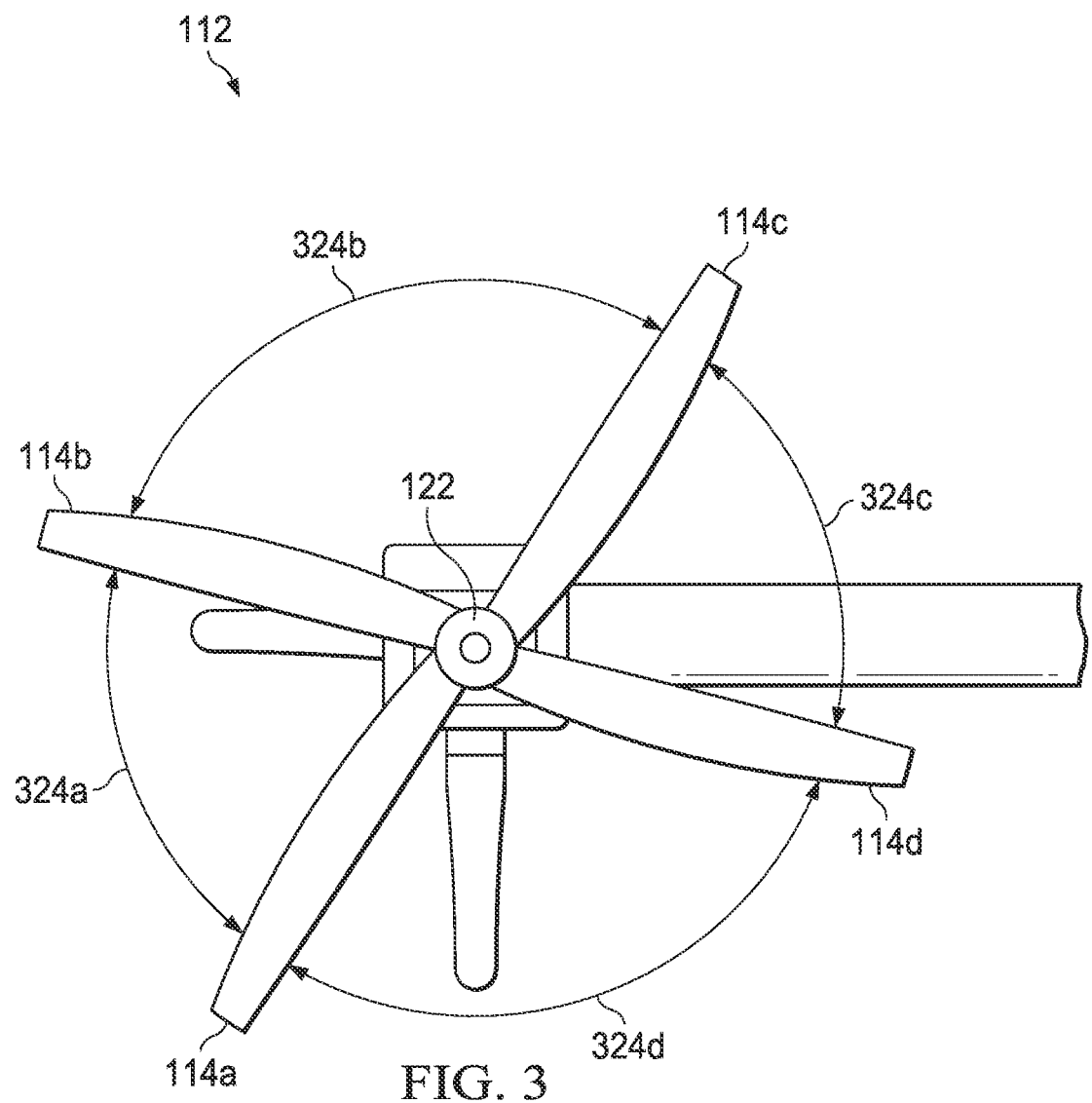
FIG. 3 illustrates a top view of a rotor system.

FIG. 3 illustrates a top view of a rotor system 112 from FIGS. 1-2. Rotor system 112 includes rotor blades 114a, 114b, 114c, and 114d extending from rotor hub 122. As described previously, rotor blades 114a, 114b, 114c, and 114d are operable to rotate in a rotor plane with rotor hub 122.

Still referring to FIG. 3, rotor blades 114a, 114b, 114c, and 114d are shown non-uniformly spaced about rotor hub 122 to create four adjacent angles in the rotor plane relative to rotor hub 122. Rotor blade 114b forms an angle 324a with rotor blade 114a relative to rotor hub 122. Rotor blade 114c forms an angle 324b with rotor blade 114b relative to rotor hub 122. Rotor blade 114d forms an angle 324c with rotor blade 114c relative to rotor hub 122. Rotor blade 114d also forms an angle 324d with rotor blade 114a relative to rotor hub 122. In the illustrated embodiment, rotor blades 114a, 114b, 114c, and 114d are arranged about rotor hub 122 in alternating angular increments, such that angles 324a and 324c are approximately equal and such that angles 324b and 324d are approximately equal. This configuration of rotor blades 114a, 114b, 114c, and 114d may be referred to as a scissors configuration. More particularly, a sum of angle 324a and either angle 324b or angle 324d equals approximately 180 degrees, with angles 324b and 324d both being greater than angle 324a. In similar fashion, a sum of angle 324c and either angle 324b or angle 324d equals approximately 180 degrees, with angles 324b and 324d both being greater than angle 324c.

For vehicles such as aircraft 100, noise is often a significant concern since such aircraft frequently operate near communities. Noise can be characterized as an n/rev vibratory mode, where is the number of rotor blades and "rev" stands for revolutions. For example, a rotorcraft having four equally spaced rotor blades would produce a primary vibratory mode of 4/rev. In various embodiments, non-uniform or asymmetric spacing of rotor blades transfers energy to sideband frequencies. Advantageously, in various embodiments, asymmetric or non-uniform spacing of rotor blades 114 about rotor hub 122 can serve to reduce human perception of noise without lowering total energy (e.g., as measured by sound pressure level (SPL) or overall sound pressure level (OASPL)) or aerodynamic performance. For example, in certain embodiments, an advantageous reduction in human-perceptible noise can be achieved by establishing angles 324a and 324c between approximately 55 degrees and 70 degrees and, correspondingly, establishing angles 324b and 324d between approximately 110 degrees and approximately 125 degrees. For example, in an embodiment, angle 324a and angle 324c each equal approximately 70 degrees while angle 324b and 324d each equal approximately 110 degrees.

In the example of FIGS. 1-2, rotor systems 112 are shown to have the same, or approximately the same, non-uniform spacing of rotor blades 114 in the fashion described relative to FIG. 3. Likewise, for illustrative purposes, rotor systems 112 are shown to rotate in approximately the same rotor plane. It should be appreciated, however, that rotor systems 112 of aircraft 100 may have different asymmetric spacing of rotor blades 114 and/or different rotor planes.

For example, different rotor systems 112 may utilize different scissoring configurations with different alternating angular increments. With reference to FIGS. 1-3, one rotor system 112 may have angles 324a and 324c of 70 degrees and angles 324b and 324d of 110 degrees, while another rotor system 112 may have angles 324a and 324c of 55 degrees and angles 324b and 324d of 125 degrees. In some embodiments, each rotor system 112 of the aircraft 100 may use angular spacing that is different from every other rotor system 112 of aircraft 100. In addition, or alternatively, rotor systems 112 can support a different number of rotor blades 114 such as, for example, more than four rotor blades 114, utilizing different scissoring laws and/or modulation principles. In addition, or alternatively, pitch angle and/or blade geometry of rotor blades 114 can be varied for different rotor systems 112. Advantageously, in various embodiments, rotor systems 112 with dissimilar blade geometry and/or pitch angles can create different rotor planes and make an acoustic signature of aircraft 100 more broadband.

FIG. 4 illustrates an example comparison 400 of an asymmetric four-blade configuration as shown in FIGS. 1-3 (with alternating angles of 70 degrees and 110 degrees) to a symmetric four-blade configuration with four 90-degree angles. The comparison 400 includes a graph 402 and a graph 404 that plot SPL versus frequency for the asymmetric and symmetric configurations, respectively. As can be seen, the asymmetric configuration introduces more tones and spreads out tonal energy, thus reducing human perception of noise.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft comprising:
an airframe having a plurality of wings and a plurality of vertical supports;
a removable pod positioned between the plurality of wings and the plurality of vertical supports;
vertical supports;
a first propulsion assembly coupled to the airframe, the first propulsion assembly comprising:
 a first rotor hub; and
 a first plurality of rotor blades non-uniformly spaced about the first rotor hub and operable to rotate in a rotor plane with the first rotor hub; and
a second propulsion assembly coupled to the airframe, the second propulsion assembly comprising:
 a second rotor hub; and
 a second plurality of rotor blades non-uniformly spaced about the second rotor hub and operable to rotate in a rotor plane with the second rotor hub;
 wherein the non-uniform spacing of the first plurality of rotor blades about the first rotor hub and the non-uniform spacing of the second plurality of rotor blades about the second rotor hub are different from one another.

2. The aircraft of claim 1, wherein the first plurality of rotor blades comprise:
a first rotor blade;
a second rotor blade that forms a first angle with the first rotor blade relative to the first rotor hub;
a third rotor blade that forms a second angle with the second rotor blade relative to the first rotor hub; and
a fourth rotor blade that forms a third angle with the third rotor blade relative to the first rotor hub and a fourth angle with the first rotor blade relative to the first rotor hub.

3. The aircraft of claim 2, wherein the second angle is greater than the first angle.

4. The aircraft of claim 2, wherein a sum of the first angle and the second angle equals approximately 180 degrees.

5. The aircraft of claim 2, wherein:
the first angle and the third angle are approximately equal; and
the second angle and the fourth angle are approximately equal.

6. The aircraft of claim 2, wherein:
the first angle is between approximately 55 degrees and approximately 70 degrees; and
the second angle is between approximately 110 degrees and approximately 125 degrees.

7. The aircraft of claim 2, wherein the first angle is approximately 70 degrees and the second angle is approximately 110 degrees.

8. The aircraft of claim 1, wherein the rotor plane of the first plurality of rotor blades and the rotor plane of the second plurality of rotor blades are different.

9. The aircraft of claim 1, comprising:
a third propulsion assembly coupled to the airframe, the third propulsion assembly comprising:
 a third rotor hub; and
 a third plurality of rotor blades non-uniformly spaced about the third rotor hub and operable to rotate in a rotor plane with the third rotor hub; and
a fourth propulsion assembly coupled to the airframe, the fourth propulsion assembly comprising:
 a fourth rotor hub; and
 a fourth plurality of rotor blades non-uniformly spaced about the second rotor hub and operable to rotate in a rotor plane with the second rotor hub.

10. The aircraft of claim 1, wherein the first plurality of rotor blades are arranged about the first rotor hub in a scissors configuration.

\* \* \* \* \*

UNITED STATES PATENT AND TRADEMARK OFFICE
CERTIFICATE OF CORRECTION

PATENT NO. : 11,745,855 B2
APPLICATION NO. : 17/106580
DATED : September 5, 2023
INVENTOR(S) : Alexander Dang Quang Truong It is certified that error appears in the above-identified patent and that said Letters Patent is hereby corrected as shown below:

In the Specification

Column 3, Line 41      Replace "("UPS")" with --("GPS")--

Column 5, Line 2      Replace "where is the number of rotor blades" with --where "n" is the number of rotor blades--

In the Claims

Column 6, Claim 1, Lines 5-7      Replace "a removable pod positioned between the plurality of wings and the plurality of vertical supports; vertical supports;" with --a removable pod positioned between the plurality of wings and the plurality of vertical supports;--

Signed and Sealed this
Fifth Day of December, 2023

Katherine Kelly Vidal
*Director of the United States Patent and Trademark Office*